(12) United States Patent
Qi

(10) Patent No.: US 11,230,202 B2
(45) Date of Patent: Jan. 25, 2022

(54) MULTIPLE VEHICLE CHARGING SYSTEM

(71) Applicant: ABB Schweiz AG, Baden (CH)

(72) Inventor: Li Qi, Cary, NC (US)

(73) Assignee: ABB Schweiz AG, Baden (CH)

( * ) Notice: Subject to any disclaimer, the term of this patent is extended or adjusted under 35 U.S.C. 154(b) by 217 days.

(21) Appl. No.: 16/715,716

(22) Filed: Dec. 16, 2019

(65) Prior Publication Data

US 2021/0178918 A1    Jun. 17, 2021

(51) Int. Cl.
*H02J 7/00* (2006.01)
*B60L 53/22* (2019.01)
*B60L 53/30* (2019.01)

(52) U.S. Cl.
CPC .............. *B60L 53/22* (2019.02); *B60L 53/30* (2019.02); *H02J 7/0045* (2013.01); *B60L 2210/10* (2013.01); *B60L 2210/30* (2013.01); *H02J 2207/20* (2020.01)

(58) Field of Classification Search
USPC ................................ 320/107, 108, 109, 110
See application file for complete search history.

(56) References Cited

U.S. PATENT DOCUMENTS

| | | | |
|---|---|---|---|
| 7,256,516 B2* | 8/2007 | Buchanan | B60L 53/53 307/62 |
| 8,072,184 B2 | 12/2011 | Bhade et al. | |
| 9,783,071 B2 | 10/2017 | Gaul et al. | |
| 9,789,774 B2 | 10/2017 | Yang et al. | |
| 10,391,870 B2 | 8/2019 | Gotz et al. | |
| 2010/0145535 A1* | 6/2010 | Tyler | B60L 3/04 700/292 |
| 2013/0069592 A1* | 3/2013 | Bouman | H02J 7/007 320/109 |
| 2018/0037121 A1* | 2/2018 | Narla | B60L 53/53 |
| 2018/0290548 A1 | 10/2018 | Kalkmann | |

FOREIGN PATENT DOCUMENTS

| | | | | |
|---|---|---|---|---|
| CN | 103795132 A | | 5/2014 | |
| DE | 102015110023 A1 | | 12/2016 | |
| EP | 2815913 A1 | | 12/2014 | |
| EP | 3339084 A1 | | 6/2018 | |
| JP | 2004129351 A | * | 4/2004 | |
| JP | 2014064397 A | * | 4/2014 | |
| JP | 2018182925 A | * | 11/2018 | |
| WO | WO-0197360 A2 | * | 12/2001 | ............ H02J 7/0027 |
| WO | WO-2016169766 A1 | * | 10/2016 | .............. H02J 7/022 |

(Continued)

OTHER PUBLICATIONS

Nair, Arun Chandrasekharan, et al., "A Solid State Transformer based Fast Charging Station for all Categories of Electric Vehicles" 2018 IEEE, 978-1-5090-6684-1/18, pp. 1989-1994, 6 pp.

(Continued)

*Primary Examiner* — Brian Ngo
(74) *Attorney, Agent, or Firm* — Greenberg Traurig, LLP

(57) ABSTRACT

A system for charging multiple electric vehicles is provided. The system includes a first electrical converter that supplies DC power to a ring bus. The ring bus is separated into a plurality of DC buses by electrical breakers. Second converters are connected to the ring bus and convert the DC power supply to a DC voltage suitable for charging electric vehicles connected thereto.

20 Claims, 3 Drawing Sheets

(56) References Cited

FOREIGN PATENT DOCUMENTS

WO    2018126393 A1    7/2018
WO    WO-2018192960 A1 * 10/2018    ............ H02J 7/0027
WO    2018202462 A1    11/2018

OTHER PUBLICATIONS

Camurca, Luis, et al., "Design of a Medium Voltage DC Fast Charging Station with Grid Voltage Regulation and Central Modular Multilevel Converter" 2018 IEEE, 978-1-4799-7312-5/18, pp. 2798-2804, 7 pp.
De Doncker, Dr. Rik W., "Fast Charging (350kW) for Electric Vehicles—Possibilities and Issues", 2019, RWTH Aachen University, Power Generation and Storage Systems, 39 pp.
Hinz, Ame, et al., "Impact and Opportunities of Medium—Voltage DC Grids in Urban Railway Systems", Institute for Power Generation and Storage Systems E.ON Energy Research Center, 2016, RWTH Aachen University, 10 pp.
Nademi, Hamed, et al., "Interfacing an Electric Vehicle to the Grid with Modular Conversion Unit: A Case Study of a Charging Station and its Control Framework", 2018 IEEE, 978-1-5090-6684-1/18, pp. 5171-5176, 6 pp.
Hoffmann, Felix, et al., "Modular EV Fast Charging Station Architectures based on Multiphase-Medium-Frequency Transformer", 2018 IEEE, 978-1-5090-6684-1/18, pp. 1327-1332, 6 pp.
Infrastructure Working Council Meeting—Day Two Presentations, Washington, D.C., Jun. 8, 2017, Electric Power Research Institute, 38 pp.
United States Patent & Trademark Office, The International Search Report and The Written Opinion issued in corresponding International application No. PCT/US2020/064246, dated Mar. 23, 2021, 7 pp.

* cited by examiner

MULTIPLE VEHICLE CHARGING SYSTEM

BACKGROUND

The present inventions relate generally to electric vehicle charging, and more particularly, to a system for charging multiple electric vehicles.

Currently, electric vehicle chargers utilize a variety of AC and DC chargers. AC chargers typically use power in the range of a few kilowatts to tens of kilowatts. On the other hand, DC chargers can use power as high as 500 kW. Therefore, DC chargers are becoming more attractive to electric vehicle car owners due to the significantly reduced charging time possible. When implemented in a multiple vehicle charging system, a DC charging system could potentially draw megawatts of power from a utility grid.

Most fast charging systems for multiple vehicles still use Low Voltage (LV) AC distribution systems. In such a system, a LVAC distribution system supplies power to multiple DC chargers. In high-power charging systems, the rating of each LVAC feeder may be hundreds of amps, and the resulting size of the distribution cables are particularly large. As the number of fast DC chargers increases in such systems, it can be envisioned that multiple vehicle charging systems could be designed to accommodate many high-power DC chargers with a multi-megawatt power usage. Thus, one aspect of the inventions is to use a LV or medium voltage (MV) DC distribution system in such electric vehicle charging systems to reduce cable sizes and lower distribution losses.

Current LVAC charging systems have multiple feeder lines. Each feeder line typically has a fully distributed design with the same components connected in series. This distribution design ensures reliable power supply from a transformer or a LVAC bus to a charger since the failure of one feeder does not impact the other feeders. However, the distributed design repeats components on each feeder and thus requires a lot of space. Due to the limited land available in urban areas, compact designs using centralized components, such as transformers or converters, may be preferred. However, in a centralized system, converters are less preferable than transformers due to their higher failure rates. Thus, one aspect of the inventions is to improve the reliability of multiple electric vehicle charging systems using converters.

SUMMARY

A charging system for multiple electric vehicles is described which provides highly reliable power to electric vehicles. Compared to LVAC charging systems, a DC charging system may have the advantage of distributing more power and having lower power losses. The implementation of centralized converters results in a compact charging system. However, a DC distribution system with centralized converters may lead to lower system reliability than common LVAC charging systems due to more frequent single point failures resulting from the lower reliability of converters compared to transformers. In order to solve these problems, the DC electric vehicle charging system of the inventions has a ring configuration to connect the DC buses together. Multiple power sources may also be provided at different buses to enable a continued supply of power even when a fault occurs in one or more of the buses.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
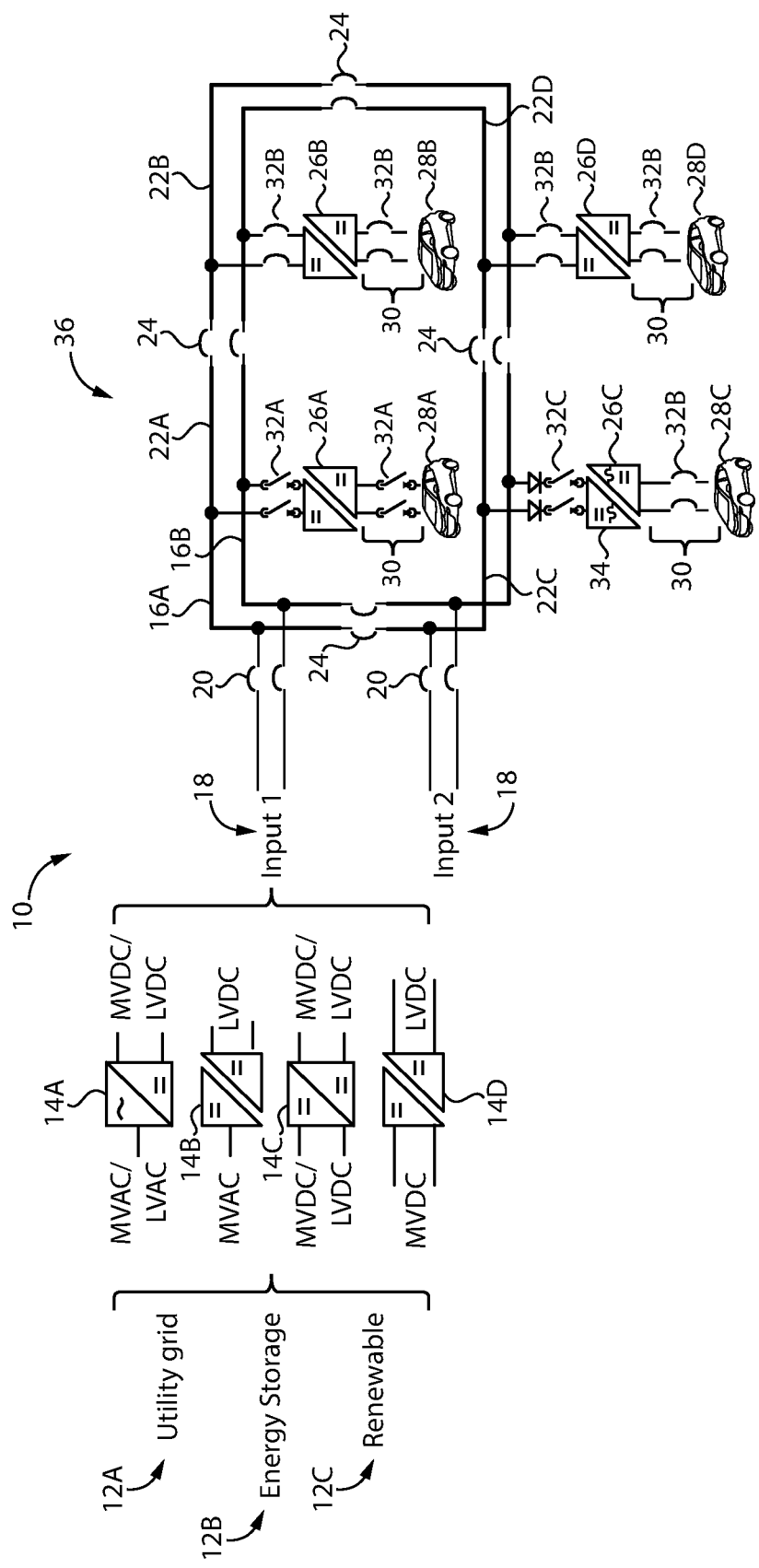
FIG. 1 is a schematic view of a multiple vehicle electric charging system.

Referring now to the figures, and particularly FIG. 1, an electric charging system 10 for multiple electric vehicles 28 is shown. In the electric vehicle charging system 10, electric power may be supplied by one or more conventional power sources 12, such as a utility grid 12A, an energy storage 12B (e.g., batteries) or renewable sources 12C (e.g., photovoltaic panels or wind turbines). Electric power from a power source 12 is then converted using a first electric converter 14 and supplied to a ring bus 16, or conductive ring 16. Various types of converters 12 may be used. For example, where the power source 12 is an AC power source 12A (e.g., a utility grid 12A), the converter 14 may be an AC to DC converter 14A, B that converts an AC voltage to a DC voltage. Alternatively, where the power source 12 is a DC power source 12B, C (e.g., an energy storage 12B, renewable resource 12C or a utility grid), the converter 14 may be a DC to DC converter 14C, D that converts a DC voltage of one voltage level to a DC voltage of another voltage level. Where the voltage levels of the input and output of the converter 14 are similar (e.g., LV-LV or MV-MV), the converter 14A, C may be non-isolated with a direct bus between the two sides of the converter 14A, C. However, where the voltage levels differ substantially between the input and output (e.g., by 10-100 times), the converter 14B, D may be provided with isolation (e.g., a transformer) between the two sides of the converter 14B, D. As illustrated, more than one power input 18 may be provided to the ring bus 16 if desired. If multiple inputs 18 are provided to the ring bus 16, it may be desirable for each input 18 to have a different power source 12 and different type of converter 14 to avoid both inputs 18 from failing at the same time for the same reason. For example, one input 18 may be supplied with power from a utility grid 12A through an AC to DC converter 14A, B. Another input 18 may then be supplied with power from an energy storage 12B through a DC to DC converter 14C, D. In this type of arrangement, one type of failure in one of the inputs 18 is unlikely to affect the other input 18, and thus, even if one input 18 fails, power may still be supplied to the ring bus 16 from the other input 18. Preferably, each input 18 is provided with a circuit breaker 20 between the respective first converter 14 and the ring bus 16.

As described above, the ring bus 16 is supplied with DC power. Because the distribution system 36 is DC powered, the cables of the ring bus 16 may be smaller than cables used in an AC distribution system. Power losses in the ring bus 16 may also be less than in an AC distribution system. The DC ring bus 16 may also be maintained at a higher voltage level than AC distribution systems. As illustrated, it may be preferable for the ring bus 16 to include two corresponding ring buses 16A, B, where one ring bus 16A is the positive bus 16A (or higher voltage potential) and the other ring bus 16B is the negative bus 16B (or lower voltage potential).

The ring buses 16 are separated into a number of DC buses 22A-D, or ring sections 22A-D, by a series of circuit breakers 24, or electrical breakers 24. That is, each DC bus 22 is defined by two circuit breakers 24 with one circuit breaker 24 at each opposite end of the DC bus 22. Naturally, one circuit breaker 24 may be shared by two adjacent DC buses 22 such that the circuit breaker 24 defines one end of two different DC buses 22. Thus, the DC buses 22 and circuit breakers 24 connected in serial define a length of the ring bus 16, and preferably, are connected in an entire interconnected ring 16. Where two ring buses 16A, B are provided, it may be preferred for the arrangement of circuit breakers 24 and DC buses 22 to directly correspond in both of the ring buses 16A, B.

A plurality of second electrical converters 26A-D may be connected to the various DC buses 22A-D around the ring bus 16. Because the ring bus 16 is DC powered, the second electrical converters 26 are DC converters 26 that preferably convert the DC voltage of the ring bus 16 to a DC voltage of another level suitable for the electric vehicles 28A-D being charged by the system 10. Where the DC ring bus 16 is maintained at a high DC voltage, it may be desirable for the second electrical converters 26 to convert the DC voltage to a lower voltage to supply the electric vehicles 28. It is understood herein that any conventional converter utilizing high-speed semiconductor switches (e.g., MOSFET, IGBT or IGCT) may be used for the first and second electrical converters 14, 26 described herein. An example of a conventional converter that uses power semiconductor switches to convert electricity may be found in U.S. Pat. No. 9,789,774, which is incorporated herein by reference.

A plurality of second converters 26 may be connected to different DC buses 22 of the ring bus 16. Although each second converter 26 illustrated in FIG. 1 is connected to a single electric vehicle 28, it is possible that each second converter 26 could supply power to multiple electric vehicles 28 if desired. As shown, each of the second converters 26 converts the electric power of the ring bus 16 to electric power that is usable by an electric vehicle 28 to charge the storage battery therein. Thus, a charge cable 30 is provided to connect each of the second converters 26 to an electric vehicle 28 for charging. As shown, it is not necessary for all of the second converters 26 to be of a matching type. However, it is preferable for each of the second converters 26 to be provided with an electrical breaker 32 between the converter 26 and the ring bus 16, and more preferably, also between the converter 26 and the electric vehicle 28. For example, if the second converter 26A has full fault interruption capability, isolators 32A may be installed at the inputs and outputs of the converter 26A. Thus, if a fault occurs in a converter 26A, all input and output isolators 32A of the converter 26A open to isolate the converter 26A. On the other hand, if a fault occurs on the DC bus 22A to which the converter 26A is connected, the input isolators 32A open to isolate the converter 26A from the faulted DC bus 22A. If a fault occurs in the vehicle charger past the converter 26A or in the electric vehicle 28A, the output isolators 32A open to isolate the faulted charger or vehicle 28A. If the second converter 26B does not have fault interruption capability, DC circuit breakers 32B are preferably installed at the input and output of the converter 26B. The DC circuit breakers 32B will also open to provide isolation as described above. Alternatively, if a charger only allows unidirectional power flow from the DC bus 22C to the electric vehicle 28C, a diode and isolator 32C can be installed in series at the input of the converter 26C. In this case, if there is a fault on the DC bus 22C, the diode 32C blocks electric power from backfeeding into the DC bus 22C. The isolator 32C also opens for galvanic isolation. Faults inside the converter 26C may be handled by fuses 34. Faults in the charger past the converter 26C or in the electric vehicle 28C can be handled by output DC circuit breakers 32B.

The second converters 26 may be connected to different DC buses 22 of the ring bus 16 to provide further isolation between each of the second converters 26, DC buses 22 and first converters 14. The following is an example of how the described distribution system 36 can improve reliability of the charging system 10. For example, in one scenario, a fault may occur in one of the DC buses 22B or in a second converter 26B connected to a DC bus 22B. When this occurs, the increased current flow causes the circuit breakers 24 at both ends of the respective DC bus 22B to open. While it is possible that both circuit breakers 24 may open simultaneously, it is also possible that there could be a slight delay between the opening of each circuit breaker 24. That is, due to the lengths of the buses 22 and the locations of the power sources 12 (i.e., the first converters 14), it is possible that a fault will initially draw current primarily from one direction (the shorter path) which will cause that circuit breaker 24 to open first. Thereafter, the fault current will be drawn through the other circuit breaker 24 which then causes that circuit breaker 24 to also open. As noted above, if the fault occurs in the DC bus 22B itself, the input isolator 32B for the second converter 26B connected to the faulted bus 22B may also open to isolate the converter 26B. However, in the scenario just described, other DC buses 22A, C, D remain connected to and powered by the first converters 14. That is, one of the second converters 26A remains connected to the first converters 14 on one side of the faulted DC bus 22B, and other second converters 26C, D remain connected to the first converters 14 on the other side of the faulted bus 22B. Thus, the remaining second converters 26A, C, D can continue charging electric vehicles 28A, C, D coupled thereto. It is understood that where a fault occurs in one of the second converters 26, it may not be necessary for the respective DC bus circuit breakers 24 to open since the respective isolator 32 between the second converter 26 and the bus 22 may open to isolate the faulted second converter 26.

In another scenario, it is possible that a fault may occur in one of the first converters 14, the DC bus 22 connected to one of the first converters 14, or a second converter 26 connected to a DC bus 22 connected to a first converter 14. In the preferred embodiments, faults occurring in the second converters 26 will be separately isolated as described above, and faults occurring in a first converter 14 will be separately isolated with input circuit breakers 20. However, any of these faults, and particularly a fault in the DC bus 22 itself, may be isolated as described above with the circuit breakers 24 opening at opposite ends of the affected DC bus 22. In this scenario where one of the first converters 14 is connected to an affected DC bus 22, the first converter 14 connected thereto will be isolated from the other second converters 26 due to the open circuit breakers 24 at the ends of the DC bus 22. However, the remaining second converters 26 will remain connected to the other first converter 14. Thus, power may still be supplied to the other second converters 26 for charging electric vehicles 28 coupled thereto.

Figure 2:
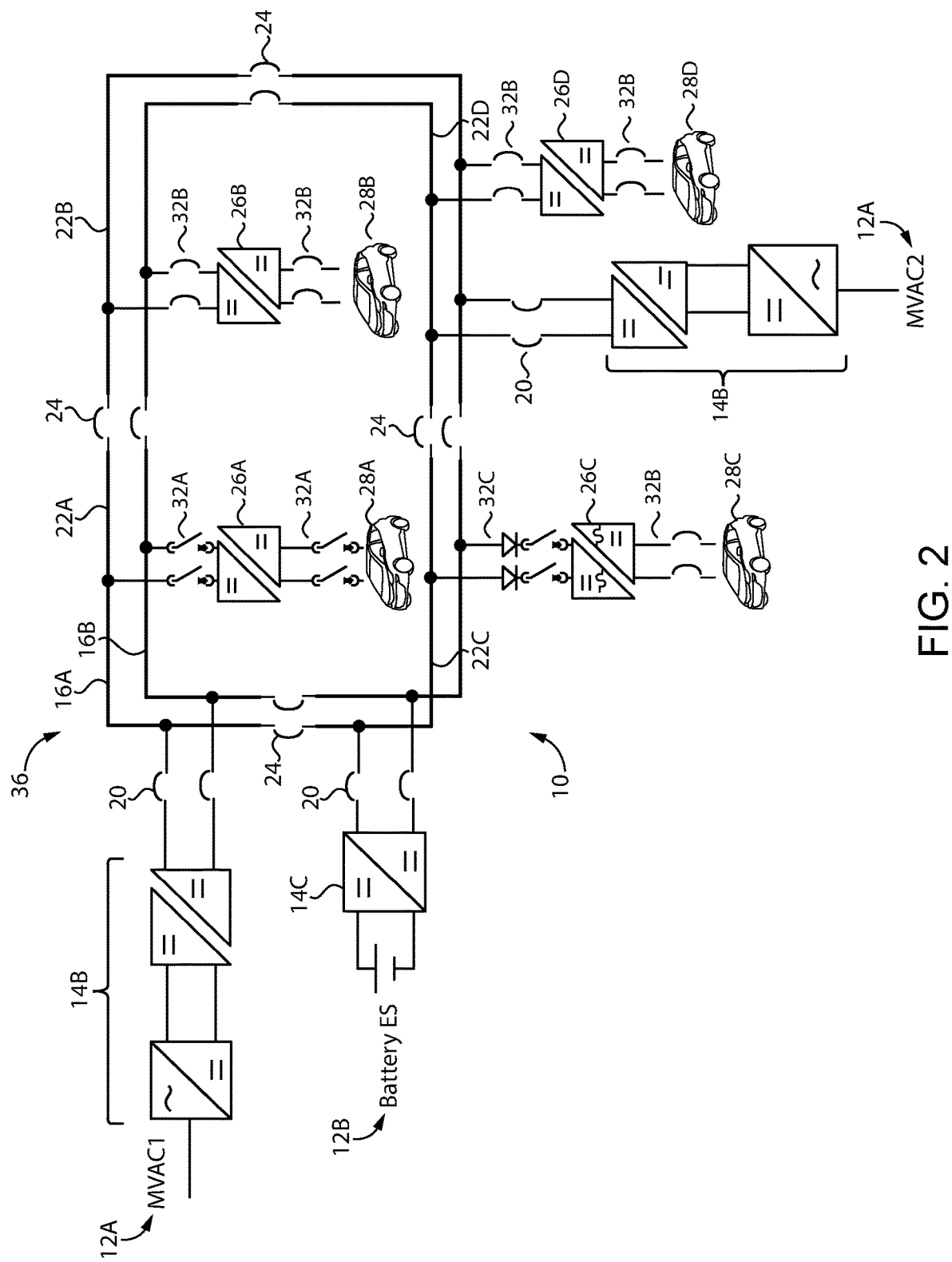
FIG. 2 is a schematic view of another charging system.

Turning to FIG. 2, it may be particularly desirable for different power sources 12 to be connected to different DC buses 22 or for a power source 12 to be connected to different buses 22 through different first converters 14. For example, a utility grid 12A may be connected through an AC-DC converter and DC-DC converter 14B to one of the DC buses 22A. A battery 12B may also be connected to another DC bus 22C through a DC-DC converter 14C. The utility grid 12A may also be connected to yet another DC bus 22D through a different AC-DC converter and DC-DC converter 14B. In this scenario, if a fault occurs in any of the power sources 12 or in any of the first converters 14, the respective input circuit breakers 20 may open to isolate the fault while power may still be supplied to the ring bus 16 through the remaining first converters 14. Further, if a fault occurs in one of the DC buses 22 to which a first converter 14 is connected, the remaining portion of the ring bus 16 can be supplied with power from the remaining first converters 14. For example, if a fault in one of the DC buses 22A causes one of the utility grid 12A inputs to be disconnected from the remaining portion of the ring bus 16, the utility grid 12A may still supply power to the ring bus 16 through another first converter 14B and DC bus 22D.

Figure 3:
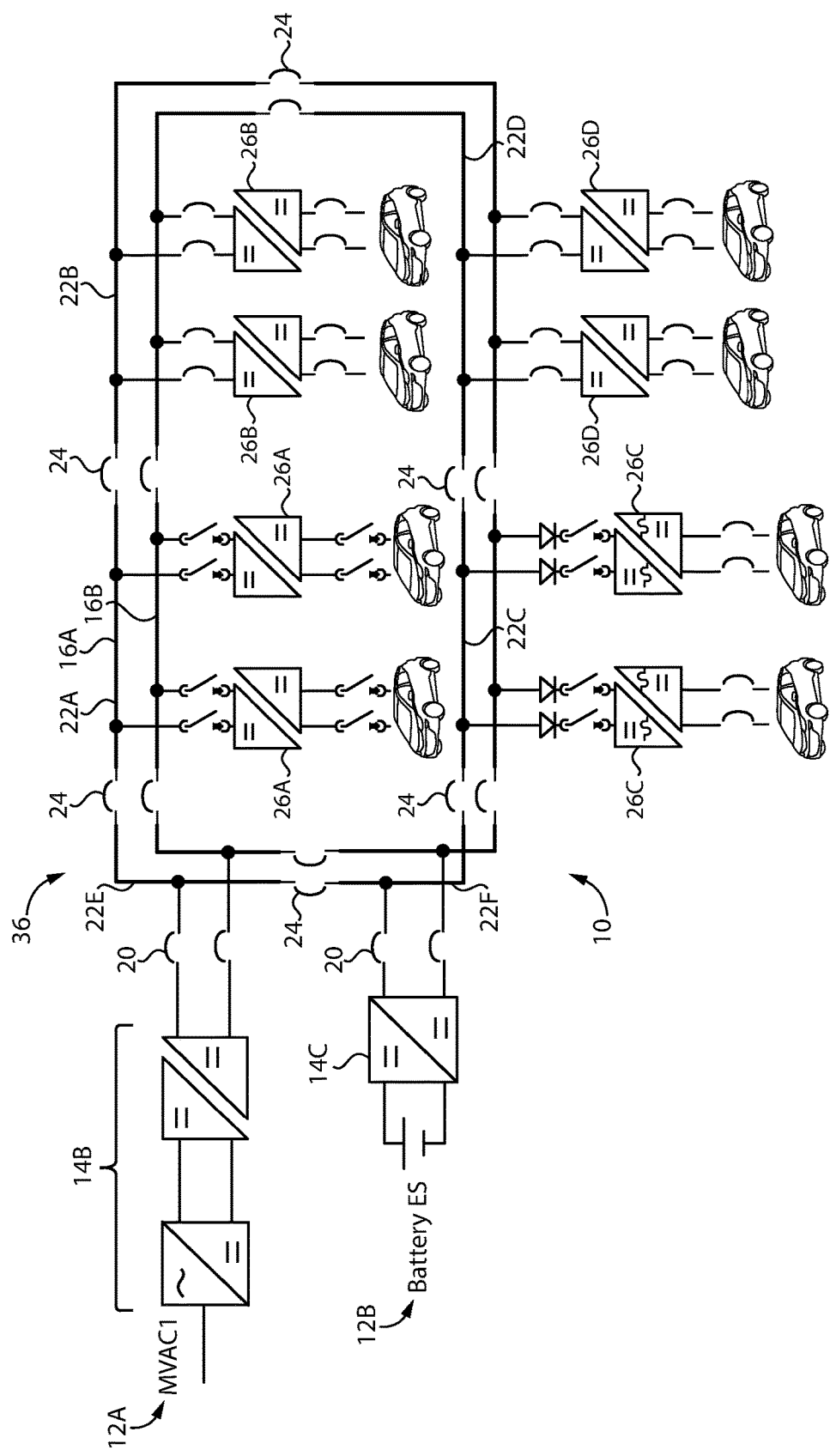
FIG. 3 is a schematic view of another charging system.

Turning to FIG. 3, it may also be desirable to have multiple second converters 26 connected to a DC bus 22 to charge multiple electric vehicles 28. Thus, in the case of FIG. 3, two second converters 26 are connected to each of the DC buses 22 with second converters 26, although more than two second converters 26 could also be connected to each DC bus 22. In this case, a fault in one of the DC buses 22A-D with second converters 26 will disconnect all of the second converters 26 that are connected to the faulted bus 22 from the ring bus 16 and from the first converters 14. However, a greater number of second converters 26 may be provided in this arrangement with less cost.

As shown, it may also be desirable to connect each of the first converters 14 to a separate DC bus 22E, F that is not connected to any of the second converters 26. Where multiple first converters 14 are provided, each first converter 14 may also be connected to a separate DC bus 22E, F from the other first converters 14. In this scenario, if a fault occurs in the DC bus 22E that one of the first converters 14B is connected to or in the first converter 14B itself, only that DC bus 22E and respective first converter 14B will be disconnected from the ring bus 16. Thus, the second converters 26 will remain connected to at least one other first converter 14C to allow continued charging. Alternatively, if a fault occurs in one of the DC buses 22B with second converters 26B or one of the second converters 26B, the respective bus 22B may be disconnected from the ring bus 16 but the remaining second converters 26A, C, D will remain connected to the first converters 14B, C to continue receiving power.

It is understood that it may be desirable to also provide communication between the power sources 12, first converters 14 and second converters 26 (e.g., 5G, WIFI or wired connections) in order to control the breakers 20 based on such communication. For example, V2X (Vehicle-to-Everything) and grid management functionality may be incorporated into the charging system 10.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A vehicle charging system, comprising:
   a first electrical converter;
   a plurality of second electrical converters;
   a conductive ring connected to the first electrical converter and the plurality of second electrical converters; and
   a plurality of electrical breakers connecting a plurality of ring sections together such that each ring section is defined by two electrical breakers at opposite ends of the ring section, the ring sections defining at least a portion of the conductive ring;
   wherein a first one of the second electrical converters is connected to a first ring section and a second one of the second electrical converters is connected to a second ring section;
   wherein a fault in the first ring section or the first one of the second electrical converters causes the electrical breakers at opposite ends of the first ring section to open and disconnect the first one of the second electrical converters from the first electrical converter while the second one of the second electrical converters remains connected to the first electrical converter.

2. The vehicle charging system according to claim 1, wherein the plurality of ring sections defines the entire conductive ring.

3. The vehicle charging system according to claim 1, further comprising more than one of the second electrical converters connected to one of the ring sections.

4. The vehicle charging system according to claim 1, wherein each of the plurality of second electrical converters convert electricity using semiconductor switches.

5. The vehicle charging system according to claim 1, wherein the first electrical converter converts electricity using semiconductor switches.

6. The vehicle charging system according to claim 1, further comprising an electrical breaker between the conductive ring and the first electrical converter.

7. The vehicle charging system according to claim 1, further comprising an electrical breaker between the conductive ring and each of the second electrical converters.

8. The vehicle charging system according to claim 1, wherein the first electrical converter converts a source of electrical energy to a DC voltage supplied to the conductive ring.

9. The vehicle charging system according to claim 1, wherein each of the second electrical converters converts a DC voltage of the conductive ring of one voltage level to a DC voltage of another voltage level.

10. The vehicle charging system according to claim 9, wherein each of the second electrical converters converts a DC voltage of the conductive ring of a higher voltage level to a DC voltage of a lower voltage level.

11. The vehicle charging system according to claim 1, further comprising a plurality of charge cables, each of the charge cables being connected to one of the second electrical converters at one end and being coupleable to an electric vehicle at another end.

12. The vehicle charging system according to claim 1, further comprising another conductive ring connected to the first electrical converter and the plurality of second electrical converters, the conductive ring being maintained at a higher voltage level than the another conductive ring.

13. The vehicle charging system according to claim 12, further comprising another plurality of electrical breakers connecting another plurality of ring sections together to define at least a portion of the another conductive ring such that each of the another ring sections corresponds to one of the ring sections of the conductive ring.

14. The vehicle charging system according to claim 1, wherein the first electrical converter converts an AC voltage from a utility grid to a DC voltage supplied to the conductive ring.

15. The vehicle charging system according to claim 1, wherein the first electrical converter converts a DC voltage of one voltage level from an energy storage, a renewable source or a utility grid to a DC voltage of another voltage level supplied to the conductive ring.

16. The vehicle charging system according to claim 1, further comprising a plurality of the first electrical converter, each of the first electrical converters being connected to different ring sections, a fault in one of the ring sections, first electrical converters or second electrical converters disconnecting one of the first electrical converters from at least one of the second electrical converters while at least one of the second electrical converters remains connected to the one of the first electrical converters.

17. The vehicle charging system according to claim 1, wherein the first electrical converter is connected to one of the ring sections not connected to any of the plurality of second electrical converters, a fault in another ring section or in any of the plurality of second electrical converters thereby not disconnecting other second electrical converters from the first electrical converter.

18. The vehicle charging system according to claim 1, further comprising a plurality of the first electrical converter, each of the first electrical converters being connected to different ring sections not connected to any of the plurality of second electrical converters, a fault in any of the plurality of second electrical converters or ring section connected thereto or a fault in one of the first electrical converters or ring section connected thereto thereby not disconnecting other second electrical converters from at least one the first electrical converters.

19. The vehicle charging system according to claim 1, wherein the first electrical converter converts a source of electrical energy to a DC voltage supplied to the conductive ring, the first electrical converter converts electricity using semiconductor switches, each of the plurality of second electrical converters convert electricity using semiconductor switches, and further comprising a plurality of charge cables, each of the charge cables being connected to one of the second electrical converters at one end and being coupleable to an electric vehicle at another end.

20. The vehicle charging system according to claim 19, further comprising a plurality of the first electrical converter, wherein one of the first electrical converters converts an AC or DC voltage from a utility grid to the DC voltage supplied to the conductive ring, and another of the first electrical converters converts a DC voltage of one voltage level from an energy storage or a renewable source to the DC voltage of another voltage level supplied to the conductive ring, and each of the first electrical converters is connected to different ring sections, a fault in one of the ring sections, first electrical converters or second electrical converters disconnecting one of the first electrical converters from at least one of the second electrical converters while at least one of the second electrical converters remains connected to the one of the first electrical converters.

\* \* \* \* \*